Jan. 9, 1934.　　　　　J. WEISS　　　　　1,943,152
METHOD OF IRRIGATING
Filed July 15, 1931
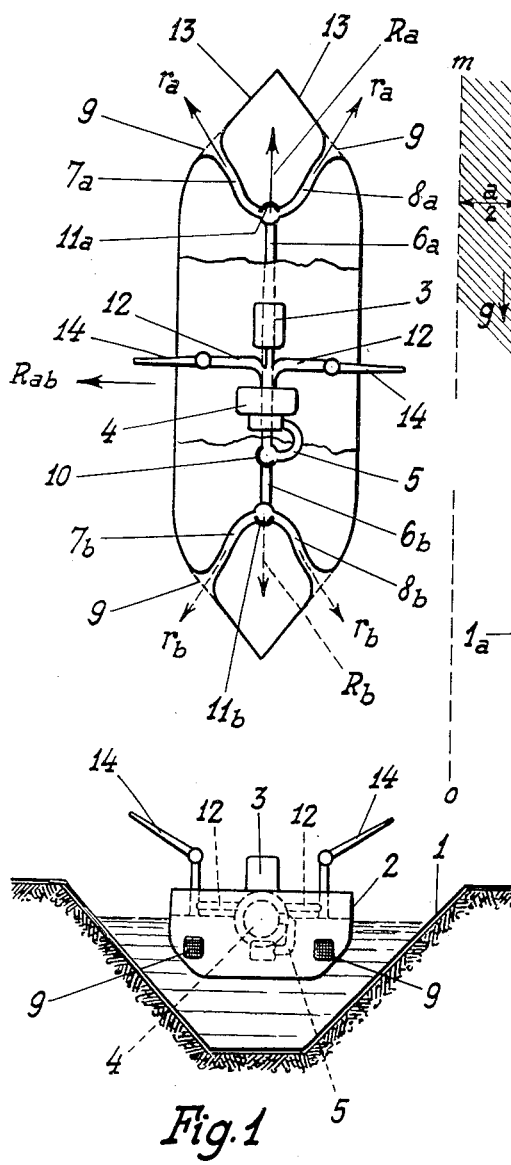
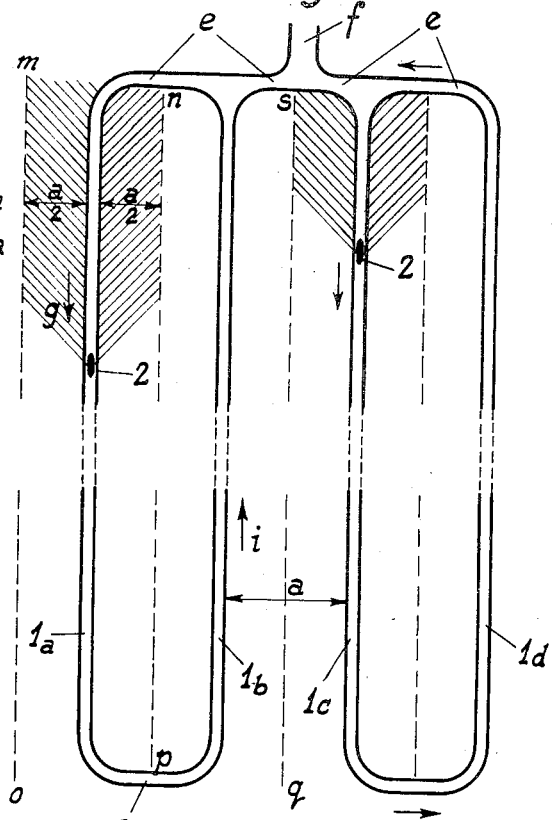
Inventor:
Jenö Weiss
By Emil Bönnelycke
Attorney Patented Jan. 9, 1934

1,943,152

UNITED STATES PATENT OFFICE 1,943,152

METHOD OF IRRIGATING

Jenö Weiss, Budapest, Hungary

Application July 15, 1931, Serial No. 551,020, and in Hungary July 22, 1930

1 Claim. (Cl. 299—52)

Sprinkling plants have been constructed with sprinkling tubes carrying a series of sprinkling nozzles or showers, said tubes being fed with the sprinkling water partly by means of stationary distributing piping and partly by means of detachably connected portable piping providing for the connection of the sprinkling tubes consecutively to different points of the stationary distributing piping. Owing to the very considerable first costs and to the high working costs of such sprinkling plants, their use had to be restricted to comparatively small territories and especially to gardening purposes. For the sprinkling of large territories, only long throw nozzles could come into consideration, but even with these the feeding by means of piping and the uniform distribution of the water over the sprinkled territory caused difficulties. The uniform distribution of the sprinkling water was effected by the use of rotary nozzles, but even by this means uniformity of sprinkling cannot be attained so that it was impossible to utilize fully the maximum throw of the nozzles and the relative distance of the points at which the several rotary nozzles were to be stationed had to be decreased beyond the maximum throw of the nozzles for sake of more or less approximate uniformity of sprinkling.

The object of the present invention is to eliminate the above drawbacks by using a couple of opposite long throw nozzles performing during operation a translatory movement substantially perpendicularly to the plane of the water jets produced by said nozzles. According to this construction, at least two long throw nozzles are arranged in such a manner opposed to each other at either side of the longitudinal axis of a boat carrying a motor driven pump adapted to float in ditches crossing the territory to be watered, that the reactive forces of the jets do not produce, during normal working, transverse or turning resulting forces. If it is intended to use said reactive forces to steer the boat in curves, the necessary turning couples may be produced by the jets in a manner known per se.

Owing to the fact that for the purpose of water distribution the jets are not rotated but perform a rectilinear translatory movement and remain parallel with their own plane, the distribution of the sprinkling water is practically uniform in the whole length and breadth of the sprinkled territory in spite of the substantially complete utilization of the total throw of the nozzles. By the use of two oppositely directed nozzles the effect of the wind, as far as its direction is equal or opposite to the direction of the jets, is compensated by the two jets.

It has been proposed to use automatically rotating nozzles operated with high pressure producing a single long-throw jet for sprinkling a territory of considerable radius (up to about 300 and more feet). It has been further proposed to mount on a carriage a single rotary long-throw nozzle together with its feeding pump and driving motor and to convey this truck by means of a tractor to different watering centers. The sprinkling, however, takes place only while the carriage is stationary and not while travelling; it would require complicated auxiliary devices to take the water from the water sources while the carriage travels along the banks of the water sources, so that the primary cost of the plant would be increased to such an extent that it would surpass even the cost of a stationary distributing piping. Besides, the sprinkling produced by a travelling rotating sprinkling nozzle would further increase the inequalities of the quantities of water distributed over the sprinkled territory.

It has also been proposed to arrange on a boat carrying a motor driven pump and floating on ditches crossing the territory to be watered, sprinkling tubes extending horizontally at either side of the boat over the banks of the ditch to about 15 feet and provided with a series of sprinkling nozzles producing water jets parallel to the travelling direction of the boat. In order to avoid obstacles such as trees on the territory to be sprinkled, the sprinkling tubes must be arranged at a considerable height above the water level, so that the sprinkling tube must be supported by wheels running on the banks which must be provided with a suitable track. This, however, increases considerably the first costs. Furthermore, the breadth of the strip sprinkled at the banks cannot exceed the length of the sprinkling tubes projecting over the bank, and the parallel ditches crossing the land to be sprinkled must be approached as near to each other as the double length of the sprinkling tubes—that is, about 30 feet. Hence, the ditches would occupy a considerable percentage of the land, which, if the upper breadth of the ditches is estimated as being only 10 feet, would amount to about 25% of the whole land. Besides this heavy loss of land, the excessive length of the ditches and comparatively large surface of water would cause heavy losses in water by diffusion into the ground and by evaporation so that owing to these circumstances, the exceedingly low output, the great number of sprinkling devices and of working hands required, such sprinkling plants have never been put into practice.

Hence, the problem of economic sprinkling of comparatively large territories remained unsolved.

The drawing shows diagrammatically an embodiment of the invention with a hydraulic reactive propulsion.

Fig. 1 is a sectional elevation of the sprinkling device and of the ditch.

Fig. 2 is a plan view, partly in section.

Fig. 3 shows a plan of a possible distribution of the ditches.

According to the invention, two long throw nozzles 14 are arranged oppositely and symmetrically at either side of the longitudinal axis of the vessel so that the reactive forces produced by the jets alone cannot push the vessel in transverse direction, nor turn it, and hence will not press it to the banks. Of course, if any other influence, such as the wind, would tend to press the boat towards the banks, this may be counteracted by controlling the said reactive forces.

The propulsion and steering of the vessel can be performed by any means. According to the drawing, the propulsion as well as the steering is effected in a manner known per se, by the reactive forces produced by the suction of the pump and by the water jets. For this purpose, for example, the breadth of the vessel 2 floating on the water surface occupies nearly the whole width of the ditch. The vessel carries a pump 4 and its driving motor 3. The suction pipe 5 of the pump 4 is bifurcated and each of its branches 6a, 6b is again bifurcated into the transversal branches 7a, 8a and 7b, 8b respectively. These latter form an angle of 45° with the longitudinal axis of the float and end below the water line on the bow surfaces 13 of the float in openings 9 closed by screens.

By means of a rotary slide 10 between the pump and the first bifurcation these latter may be alternatively opened or closed. In each of the branches 6a and 6b a further rotary slide 11a and 11b respectively allows the alternative opening or closing of the branches 7a, 8a and 7b, 8b respectively. The delivery pipes 12 of the pump 4 feed the nozzles 14, 14 arranged at either side of the longitudinal axis of the vessel. The short range sprinkling is effected in any known manner, for example, by altering the elevation of the nozzles, or decreasing the pump pressure, by shutters extending into the water jet or by means of auxiliary nozzles.

In the position of the slide 10 shown in the drawing, the water will be sucked in through the branches 7a and 8a in equal quantities, so that the reaction forces $r_a$ will drive the vessel into the direction of the resultant $R_a$. By turning the slide 10 the channel 6a can be successively obstructed and the channel 6b correspondingly opened, so that the pump will receive the water partly through the branches 7b and 8b of channel 6b. Thereby the force of reaction $R_a$ will be decreased and an opposite force of reaction $R_b$ will be produced. Thereby the propulsion force decreases and will be zero if the forces of reaction $R_b$ and $R_a$ balance each other. On further rotation of the slide 10 the force of reaction $R_b$ overcomes the reaction $R_a$ and the propulsion is reversed.

The steering can be effected by turning the slides 11a and 11b, so that the forces of reaction on both sides become unequal and the resultant thereof will form a smaller or greater angle with the longitudinal axis of the float.

According to the example shown in Fig. 3 the ditches 1a—1b are parallel to each other, so that they divide the land to be watered into strips of the breadth $a$. This breadth is approximately twice the maximum throw $$\frac{a}{2}$$

of the nozzles 14.

The ditches 1a—1b are connected by means of canals $e$ with the main feeding channel $f$. The water level in the system of ditches must be kept to the working height. The sprinkling device 2 driven along the ditch 1a in the direction of arrow $g$ will water at either side of the ditch a strip of land of the breadth $$\frac{a}{2}$$

as shown by the hatched surface. If the springing device 2 has reached the end of ditch 1a, the whole surface $mnpo$ has been watered. Thereupon the sprinkling device 2 enters through channel $h$ the ditch 1b and is driven in the direction of arrow $i$, watering thereby the surface $pqsn$. If the strips of land are so long that after the watering of the surface $pqsn$, the strip $mnpo$ must again be watered, the sprinkling device must return through canal $e$ into ditch 1a, while a second sprinkling device 2 is provided for the ditches 1c, 1d. If, however, the ditches are of sufficient length, each ditch can be provided with its own sprinkling device. If in contrary, a single sprinkling device is sufficient for all the ditches, the device after having reached the end of ditch 1b, will enter through canal $e$ the ditch 1c and when arrived at its end will be transferred into ditch 1d, whereupon it can return through canal $e$ into ditch 1a.

The uniform distribution of water over the whole breadth of the strips of land $$\frac{a}{2}$$

(Fig. 3) can be reached by repeatedly driving the sprinkling device along the same ditch, while the watering nozzles 14 are adjusted at every stroke of the sprinkling device along the ditch, in any known manner, to a different distance of throw.

As the distribution of the water over the territory to be sprinkled is effected by the translatory movement of the vessel and the distribution takes place owing to the long throw of the nozzles on land strips of very considerable breadth, a very minute translatory speed, such as less than 3 inches per second, will be sufficient and will require only a very small amount of energy.

What I claim is:—

A method of supplying water to vegetation on large tracts of land having widely separated water channels extending therethrough, comprising moving a floating vessel through the water channels, withdrawing water from the channels and projecting the same in streams flowing at high velocity from each side of the vessel in directions substantially transverse to the path of movement of the vessel and upwardly at an angle calculated to effect substantially uniform sprinkling of the area of land traversed by the projected streams of water, the exact direction of projection of the streams of water being adjusted to avoid the production of a turning moment on the floating vessel and the resultant lateral propulsive force of the stream of water projected from one side of the vessel being balanced with respect to the resultant lateral propulsive force of the stream projected from the other side thereof to avoid side slip of the vessel in the water channels.

JENÖ WEISS.